United States Patent
Kerspe et al.

(10) Patent No.: US 9,527,653 B2
(45) Date of Patent: Dec. 27, 2016

(54) INSULATION HOUSING AND METHOD FOR THE PRODUCTION OF AN INSULATION HOUSING

(71) Applicants: KOENIG METALL GmbH & Co. KG, Gaggenau (DE); Jobst H. Kerspe, Mauer (DE)

(72) Inventors: Jobst H. Kerspe, Mauer (DE); Michael Fischer, Gaggenau (DE)

(73) Assignees: KOENIG METALL GmbH & Co. KG, Gaggenau (DE); Jobst H. Kerspe, Mauer (DE)

( * ) Notice: Subject to any disclaimer, the term of this patent is extended or adjusted under 35 U.S.C. 154(b) by 0 days.

(21) Appl. No.: 14/790,491

(22) Filed: Jul. 2, 2015

(65) Prior Publication Data

US 2016/0001954 A1   Jan. 7, 2016

(30) Foreign Application Priority Data

Jul. 3, 2014   (DE) .................. 10 2014 109 332

(51) Int. Cl.
*B65D 81/38*   (2006.01)
*F25D 23/06*   (2006.01)

(52) U.S. Cl.
CPC ......... *B65D 81/3823* (2013.01); *F25D 23/063* (2013.01); *F25D 2201/14* (2013.01)

(58) Field of Classification Search
CPC ........... B65D 81/3823; F25D 2201/014; F25D 23/063
USPC ....................... 220/592.27, 592.26
See application file for complete search history.

(56) References Cited

U.S. PATENT DOCUMENTS

| | | | | |
|---|---|---|---|---|
| 5,979,693 A | * | 11/1999 | Bane, III | ........... B65D 81/3825 220/23.9 |
| 6,220,473 B1 | * | 4/2001 | Lehman | ............. B65D 81/3858 150/901 |
| 2010/0003578 A1 | * | 1/2010 | Wahl | ................... H01M 2/1094 429/493 |
| 2012/0318808 A1 | * | 12/2012 | McCormick | .......... F16L 59/065 220/592.21 |
| 2013/0221011 A1 | | 8/2013 | Yoon et al. | |

(Continued)

FOREIGN PATENT DOCUMENTS

DE   43 11 510 A1   10/1994
EP   0 990 406 A2   4/2000

(Continued)

*Primary Examiner* — Stephen Castellano
(74) *Attorney, Agent, or Firm* — Collard & Roe, P.C.

(57) ABSTRACT

Proceeding from a state of the art from which double-walled insulation housings that are provided with supported vacuum insulation are already known, the invention proposes an improved insulation housing that is characterized in that first, a planar surface element (1) is produced, in which the wall elements (2) of the insulation housing, which are connected with one another, are connected with one another by means of a transition region, which region has a notch (10), wherein it is made possible, in this way, to produce the three-dimensional spatial shape of the insulation housing only in a last production step, by means of corresponding folding and setting upright of the wall elements (2) that are connected with one another, and subsequently to fix the wall elements (2) in place in this spatial shape, in accordance with the intended purpose.

9 Claims, 1 Drawing Sheet

Planar surface element (1)

(56) References Cited

U.S. PATENT DOCUMENTS

2013/0256318 A1    10/2013   Kuehl et al.
2013/0305535 A1    11/2013   Cur et al.

FOREIGN PATENT DOCUMENTS

| JP | H07-19392 A | 1/1995 |
| JP | H11-11454 A | 1/1999 |
| WO | 97/45326 A1 | 12/1997 |
| WO | 01/18316 A1 | 3/2001 |
| WO | 2012/017903 A1 | 2/2012 |

\* cited by examiner

FIG. 1 Planar surface element (1)
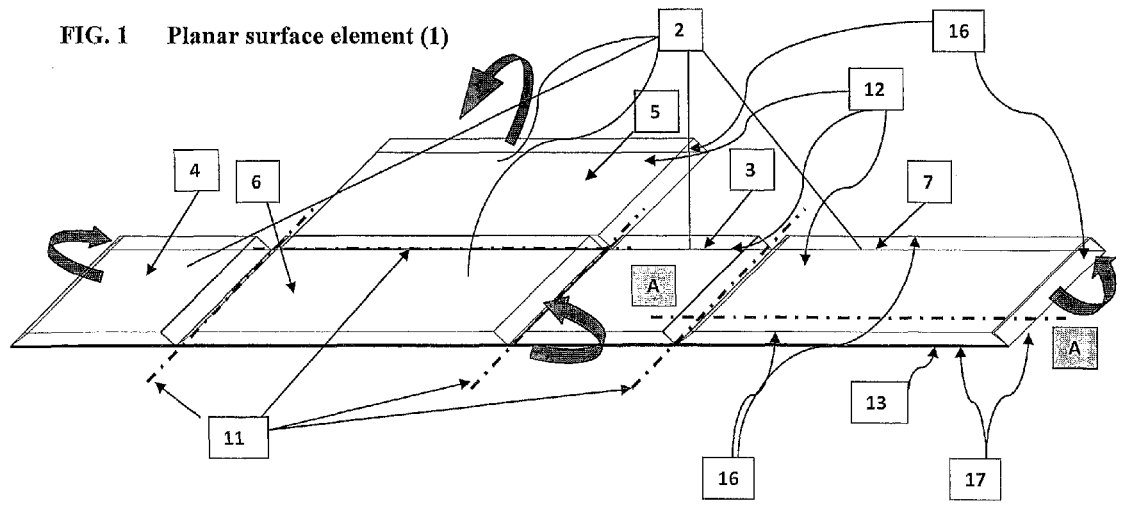
FIG. 2 Section AA
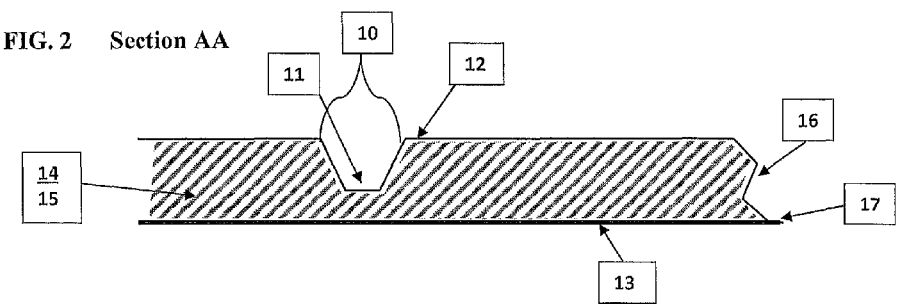
FIG. 3
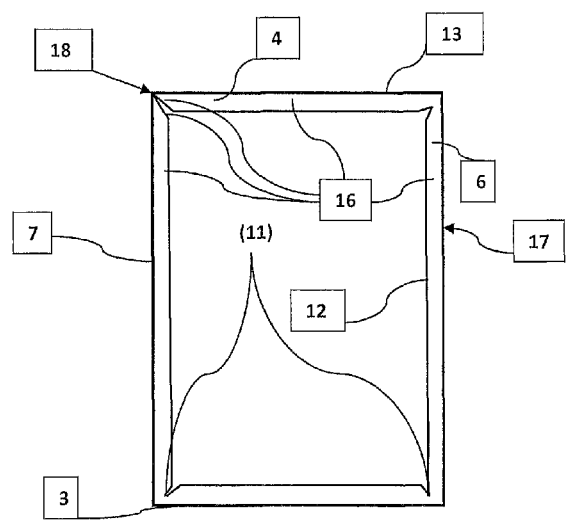

INSULATION HOUSING AND METHOD FOR THE PRODUCTION OF AN INSULATION HOUSING

CROSS REFERENCE TO RELATED APPLICATIONS

Applicant claims priority under 35 U.S.C. §119 of German Application No. 10 2014 109 332.1 filed on Jul. 3, 2014, the disclosure of which is incorporated by reference.

The invention relates to an insulation housing having a double wall, comprising an inner wall and an outer wall at a distance from the former, wherein the interstice between the inner and outer wall, configured to be vacuum-tight, is filled with a porous, preferably micro-porous or nano-porous fill material, and is evacuated to form an at least slight vacuum, as well as to a method for its production, wherein the insulation housing, within the scope of production, is at first configured as a cohesive planar surface element, wherein the transition region between the individual wall elements is configured as a notch, the base of which is defined by a bending line, in each instance, wherein then, the spatial shape of the insulation housing can be produced in such a manner that the individual wall elements are pivoted about the respective bending lines and set upright, in such a manner that the insulation housing is closed, at least to a great extent, and, in a last step, the wall elements are permanently connected with one another at the butt joints that occur in the region of adjacent wall elements.

Such an insulation housing is previously known from US 2013/0256318 A1. In this connection, a closed spatial body without a front and rear wall is constructed from an unrolled form of square tubes connected with one another, which are each open at the face sides. Because of the use of square tubes that are closed with the exception of the face sides, connecting a front and/or rear wall is not possible in this embodiment. The tubes are filled with a filler to form an insulation wall, in such a manner that first, one of the face sides that is open at first is closed, and subsequently the tube is filled with the filler. Subsequently, the other face side is also closed. After this has been done for all the square tubes connected in the unrolled form, the housing, which is open at the front and rear side, is set upright and then evacuated.

Furthermore, an insulation housing is previously known from DE 43 11 510 A1, in which a smaller inner housing and a larger outer housing are set upright to form a closed spatial shape from a planar foldable panel, comprising a floor plate, two side walls, a rear wall, and a ceiling element, in each instance. Subsequently, the smaller inner housing is introduced into the outer housing, and the interstice is filled with a further prefabricated foldable panel composed of powder introduced between gas-tight plastic films. Subsequently, these plastic elements, filled with powder, lie between the inner and the outer housing, and are supposed to be glued to the adjacent walls in this position in accordance with their intended use. Only then does evacuation of the housing take place, and only thereby is the complete finished state of the arrangement produced.

A further insulation housing is known from EP 0 990 406 A2. In detail, the previously known housing is a large-area insulation housing for household appliances such as refrigerators, freezers, and hot-water storage tanks. Such housings are conventionally structured with a plastic foam insulation that lies in between. In the interest of more efficient heat insulation to reduce energy consumption, however, heat insulations having improved efficiency are increasingly in demand. At the same or at least an acceptable insulation thickness, improvements in this regard can be achieved only with evacuated insulations. In this connection, solution proposals have become known, in which the refrigeration appliance housings are equipped with prefabricated plates, vacuum-insulated in and of themselves, called vacuum insulation panels (VIPs), and the still remaining interstices are filled with foam. This solution has also proven to be somewhat unsatisfactory in the meantime, because for one thing, high production costs occur due to the great number of different components, materials, and modules. Furthermore, filling the interstices with foam brings about the result that the different materials are glued to one another more or less irreversibly, so that later recycling or utilization of the refrigerator housing after its useful lifetime has ended is as good as impossible. In general, the housings must be disposed of in their entirety, as hazardous waste. Furthermore, the sheathings of the vacuum insulation panels (VIPs) contain metallic components to reinforce them, so that heat bridges are formed at least in the region of the join, in other words in the regions where the VIPs abut one another, and therefore these allow connection in these regions and thereby reduce the insulation effect.

In this connection, it is known from EP 0 990 406 A2, in the case of a double-walled, vacuum-tight housing of a refrigerator, to fill the interstice between the inner and the outer wall with a supported vacuum insulation, wherein the support body consists of a pourable (granulate or powder form) silicon oxide compound, wherein the silicon oxide compound is preferably a foam granulate. For the remainder, the interstice is evacuated to a residual gas pressure $p<10^1$ mbar.

Independent of this, a molded insulation body and a method for its production are previously known from WO 01/18316 A1. In detail, this involves a molded insulation body configured as a heat insulation panel, having a pressed insulation layer composed of microporous insulation material, which body is bendable and therefore lies closely against the insulating substratum, particularly pipes, above all heating pipes. This is achieved in that at least the insulation layer has groove-like embossings on its broad side, which embossings are oriented along a bending line. The embossings make it possible to lay the molded insulation body, which is at first planar, around a heating pipe, and subsequently to surround it with a wrapping.

Proceeding from this prior art, the invention is based on the task of creating an insulation housing having at least comparable insulation properties, which offers advantages with regard to its production, storage, as well as with regard to transport of the insulation housing, as compared with the state of the art, as well as indicating a method for the production of this insulation housing.

The solution for this task is accomplished by means of an insulation housing having the characteristics of the current claim 1 as well as by means of a method according to claim 13. Advantageous embodiments of the insulation housing according to the invention can be derived from the dependent claims 2 to 12. The particular characteristic of the insulation housing according to the invention consists in that the insulation housing is at first configured as a planar surface element, comprising the individual wall elements of the insulation housing, and that the transition regions between the individual wall elements are formed as notches, the base of which is defined by a bending line, in each instance. Subsequently, the three-dimensional spatial shape of the insulation housing can then be produced, in simple manner, in that the individual wall elements are set upright around a floor wall element, and, in this connection, are pivoted about the bending lines until a spatial shape that is closed, at least to a great extent, has been produced, and subsequently the wall elements are permanently connected with one another at the respective butt joints of the adjacent wall elements.

The invention is therefore based on the surprising idea of producing not a finished insulation housing but rather an intermediate product at first, which product is a cohesive planar surface element comprising the individual wall elements of the insulation housing. This planar surface element can then be stacked and stored in simple manner, with significantly less required space, and can be transported with clearly reduced required space, if necessary. Only in a final production step are the individual wall elements pivoted in the region of the bending lines, and the three-dimensional spatial shape of the insulation housing is set upright as a result, and subsequently the individual wall elements are permanently fixed in place in this position.

In an advantageous embodiment, in this solution, too, the fill material of the interstice between the inner and the outer wall is configured in such a manner that it possesses a supporting function. Therefore, supported vacuum insulation is implemented in the object of the invention, as well. In this connection, the fill material holds the outer and inner wall at a defined distance on the basis of its supporting effect, also in the final spatial shape of the insulation housing, and therefore ensure an insulation effect also in this region, although this effect might be reduced.

A mineral material having low solid-body heat conductivity with simultaneously low out-gassing is particularly suitable; this material should furthermore have a fine-pore structure. Alternatively, an open-cell inorganic foam can also be used. Also, pyrogenic silica is suitable as a fill material. However, the presently preferred embodiment provides for a fill material composed of highly compacted glass fibers.

The outer wall of the insulation housing according to the invention is preferably produced from a high-quality stainless steel, which possesses the required shape retention and corrosion resistance.

The inner wall, which is usually configured to have a clearly thinner wall, should also be composed of sheet stainless steel, for reasons of corrosion resistance.

In a concrete embodiment, the transition region between the individual wall elements of the insulation housing is configured in such a manner that the inner wall is pre-shaped in such a manner that it forms a circumferential outer circumference phase of the planar surface element.

In this connection, it is advantageous if this transition membrane is configured to have a clearly thinner wall than the inner and outer wall. The reduction in wall thickness can be achieved, for example, by means of a corresponding forming process or by means of the use of what are called "tailored blanks," which are prefabricated in different sheet-metal thicknesses.

In an advantageous further development, this transition membrane is then welded to the outer wall in vacuum-tight manner, circumferentially, in the region of the outer circumference phase of the planar surface element.

In this connection, the respective weld seam for connecting the transition membrane with the outer wall can be implemented by means of an easily implemented continuous spot-weld seam or laser-weld seam.

After the individual wall elements that are connected with one another in the planar surface element have been welded in vacuum-tight manner in this way, this cohesive surface element is evacuated until preferably a residual gas pressure of $p \leq 0.1$ mbar has been achieved. Subsequently, supported vacuum insulation is then involved; this is known to possess a very high heat insulation effect and prevents possible convection to a great extent and permanently.

After all the wall elements have been evacuated accordingly, an insulation housing that is completely capable of functioning stands ready, suitable for transport or for storage, but still as a planar surface element. Finally, in a last production step, preferably shortly before delivery of the insulation housing to the end customer or to the trade, the planar surface elements can be set upright into their spatial shape, and can be permanently connected with one another by means of additional mechanical connection elements, for example sheet-metal tabs on the outside that engage over the respective butt joints of the wall elements involved, in each instance, which tabs are fixed in place by means of screws, or by means of suitable glued seams.

Alternatively, the task according to the invention is accomplished with the characteristics of the method claim 13.

The invention will be explained in greater detail below, using an exemplary embodiment shown only schematically in the drawing.

This shows:

FIG. 1: a planar surface element composed of wall elements of an insulation housing that are connected with one another, in a perspective view, FIG. 2: a detail of the planar surface element designated as AA in FIG. 1, in a cross-sectional view, and FIG. 3: the planar surface element according to FIG. 1 after the wall elements have been set upright, in the spatial shape of the insulation housing, in a front view.

FIG. 1 shows a planar surface element 1 having wall elements 2 that border on one another, of an insulation housing, not shown in any further detail in the drawing, which housing is closed, to a great extent. In this connection, the planar surface elements 1 consists, in detail, of the following wall elements 2, a floor element 3, a ceiling element 4, a rear wall 5, as well as a first and second side wall 6 and 7. In this connection, the individual wall elements 2 are interconnected with the adjacent wall elements 2, in each instance, by means of a transition region, which region essentially possesses the form of a notch 10, wherein the corresponding notch does not necessarily have to be configured to be triangular, but, if applicable, can also have the shape of a U or of a trough profile, in other words can also be configured in the form of a groove, for example. The apex of the notch 10 is viewed as being an imaginary bending line 11 hereinafter, in each instance. The individual wall elements 2 themselves are each configured to be double-walled, in other words consist of an inner wall 12 and an outer wall 13, between which a fill space 14 is disposed.

According to the sectional representation in FIG. 2, the outer wall 13 is a stainless steel sheet, which preferably possesses a sheet thickness between 0.5 and 0.8 mm. The inner wall 12 is also configured as a stainless steel sheet, but has a clearly thinner wall, for example with a sheet thickness below 0.5 mm. The fill space 14 is situated between the inner wall 12 and the outer wall 13; it is filled with an insulating fill material that simultaneously possesses a supporting function. This supporting function holds the inner and outer wall 12 and 13 at a distance even in the region of the notches 10. In the present exemplary embodiment here, the fill material 15 consists of highly compacted glass fibers. In this connection, it can be assumed that all the wall elements 2 of the planar surface element 1 are configured analogously.

In this connection, the detail view in FIG. 2 shows the transition region formed between the adjacent wall elements 2 in a sectional view. Accordingly, a transition membrane 16 that covers the face side of the respective wall element 2 is formed onto the thin-walled inner wall 12, in such a manner that it forms a circumferential outer circumference phase that engages around the planar surface element 1. In the end result, the transition membrane 16 therefore represents an extension of the inner wall 12 that forms the wall of this outer circumference phase. In this connection, the transition membrane 16 is clearly configured to be thinner than the inner wall 12, for example by means of an additional forming process.

The transition membrane 16 is welded to the outer wall 13 in vacuum-tight manner. The corresponding weld seam can be applied manually, comparatively easily, as a line weld seam, running around the planar surface element 1 as a whole. Alternatively, instead of the weld seam, a glued connection or a mechanical connection, for example by means of crimping, can also be provided at this location. After all the wall elements 2 that are connected with one another have been accordingly closed in vacuum-tight manner, evacuation of the fill space 14 of the cohesive planar surface element 1 as a whole takes place, up to a residual gas pressure $p \leq 0.1$ mbar, wherein in this way, the insulation effect of the wall elements 2 and thereby of the insulation housing as a whole is once again clearly reinforced.

The planar surface element 1, which has been completed in this regard, can then be stored or transported in this unrolled form, in space-saving manner.

Usually just before delivery to the end customer or to the trade, the individual wall elements 2 are then, in a last production step, set upright or bent about the bending lines 11 that are entered in FIG. 1, according to the arrows, and thereby an insulation housing that is closed, to a great extent, is produced, which housing is fixed in place in this spatial shape, in that suitable connection elements, for example tabs that engage over the connection surface, are applied, on the inside and/or outside, in the transition regions that are marked by the notches 10, and secured, for example by means of attachment screws, and in this way, the wall elements 2 are fixed in place in the three-dimensional spatial shape of the insulation housing. After the planar surface element 1 has been set upright according to FIG. 1, into its final spatial shape according to FIG. 3, a complete insulation housing is formed, for example for a refrigerator or freezer, with the exception of the refrigerator door, which is articulated onto one side so as to pivot, onto the frame of the insulation housing that faces away from the rear wall, for example after the interior mechanisms have been introduced into the insulation housing. In this connection, the refrigerator door is usually also provided with an analogous supported vacuum insulation as the other wall elements 2.

In this connection, not only refrigerator or freezer housing but also entire refrigeration rooms can be put together from such surface elements, using the same technology. In the automotive sector, this technology is suitable for constructing battery housings or for engine encapsulation. In apparatus construction, furnace muffles or heat storage units can be implemented using this technology.

REFERENCE SYMBOL LIST 1 surface element
2 wall element
3 floor element
4 ceiling element
5 rear wall
6 first side wall
7 second side wall
10 notch
11 bending line
12 inner wall
13 outer wall
14 fill space
15 fill material
16 transition membrane
17 weld seam
18 butt joint

The invention claimed is:

1. Insulation housing having a double wall, comprising an inner wall and an outer wall at a distance from the former, wherein the interstice between the inner and outer wall, configured to be vacuum-tight, is filled with a porous, preferably micro-porous or nano-porous fill material, and is evacuated to form an at least slight vacuum, wherein the insulation housing, within the scope of production, is at first configured as a cohesive planar surface element, wherein the transition region between the individual wall elements is configured as a notch, the base of which is defined by a bending line, in each instance, wherein then, the spatial shape of the insulation housing can be produced in such a manner that the individual wall elements are pivoted about the respective bending lines and set upright, in such a manner that the insulation housing is closed, at least to a great extent, and, in a last step, the wall elements are permanently connected with one another at the butt joints that occur in the region of adjacent wall elements, wherein the cohesive planar surface element comprises the wall elements, a floor element, a ceiling element, a rear wall, as well as a first and second side wall, wherein the individual elements are each configured to be double-walled, each comprising an inner wall and an outer wall, between which a fill space is disposed, wherein the inner wall is configured to be clearly thinner, in each instance, than outer wall, wherein the inner wall is a stainless steel sheet, wherein the inner wall is preformed circumferentially onto the outer contour of the planar surface element, in such a manner that the wall makes a transition into a transition member that follows the inner wall, which membrane forms a circumferential outer circumference phase of the planar surface element, and wherein the transition membrane is configured to have a significantly thinner wall than the inner wall and the outer wall.

2. Insulation housing according to claim 1, wherein the fill material additionally possesses a supportive function in the interstice.

3. Insulation housing according to claim 2, wherein the fill material is a mineral material having low solid-body. conductivity, low out-gassing, with a fine-pore structure, or an open-cell inorganic foam, particularly compose of highly compacted glass fibers.

4. Insulation housing according claim 1, wherein the outer wall is producing from stainless steel.

5. Insulation housing according to claim 1, wherein the transition membrane is connected with the outer wall in vacuum-tight manner, glued by a glue seam or by a mechanical connection.

6. Insulation housing according to claim 5, wherein the transition membrane is connected with the outer wall by a spot-weld seam or a continuous laser-weld seam.

7. Insulation housing according to claim 1, wherein the planar surface element is evacuated after circumferential vacuum-tight welding of the transition membrane to the outer wall.

8. Insulation housing according to claim 1, wherein setting the insulation housing upright from the planar surface element to its spatial shape takes place after evacuation of the planar surface element.

9. Insulation housing according to claim 8, wherein the insulation housing can be fixed in place in its final spatial shape by means of suitable mechanical connection elements, each engaging over the butt joints, for example by means of screwed sheet-metal tabs, and/or by means of gluing.

\* \* \* \* \*

UNITED STATES PATENT AND TRADEMARK OFFICE
CERTIFICATE OF CORRECTION

PATENT NO.         : 9,527,653 B2                                    Page 1 of 1
APPLICATION NO.    : 14/790491
DATED              : December 27, 2016
INVENTOR(S)        : Kerspe et al.

It is certified that error appears in the above-identified patent and that said Letters Patent is hereby corrected as shown below:

In the Claims

In Column 6, Line 55, (Line 2 of Claim 3) after "solid-body" please delete: ".".

In Column 6, Line 59, (Line 1 of Claim 4) after the word "according" please insert the word: --to--.

Signed and Sealed this
Twenty-first Day of February, 2017

Michelle K. Lee
*Director of the United States Patent and Trademark Office*